Oct. 14, 1969  D. E. BROUSSARD ET AL  3,472,035
METHOD OF ABANDONING AND RECOVERING A PIPELINE
DURING AN UNDERWATER PIPE LAYING OPERATION
Filed May 11, 1967  6 Sheets-Sheet 1
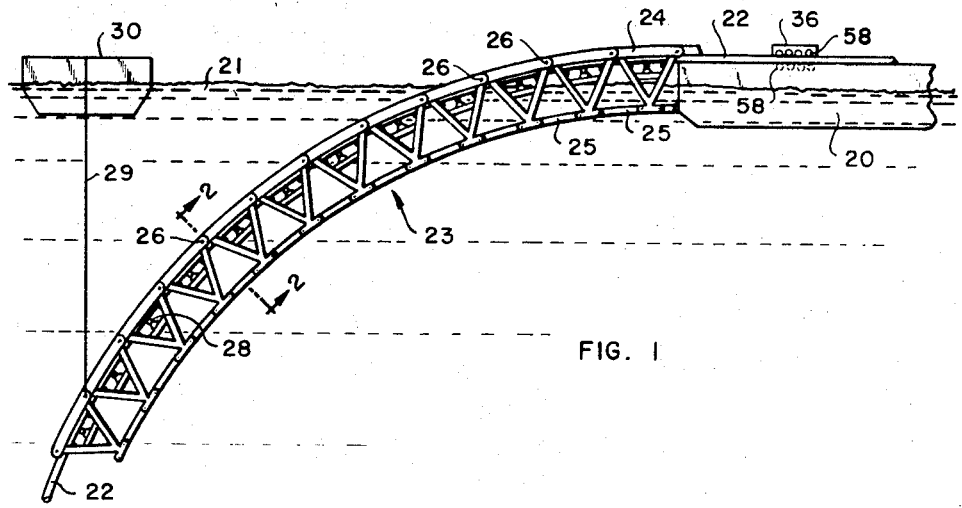
FIG. 1
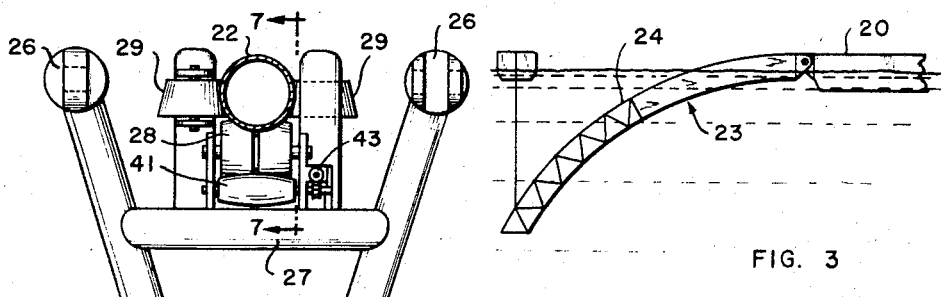
FIG. 3
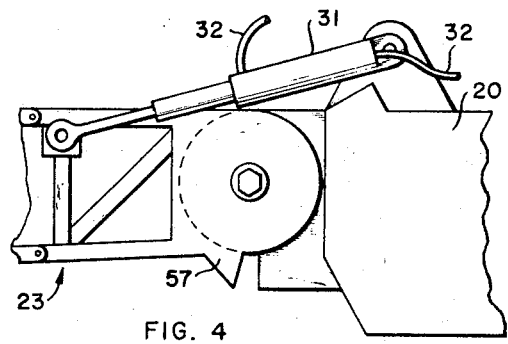
FIG. 2
FIG. 4
INVENTORS:
DOUGLAS E. BROUSSARD
DONALD W. BARRY
BY: J. H. McCarthy
THEIR AGENT

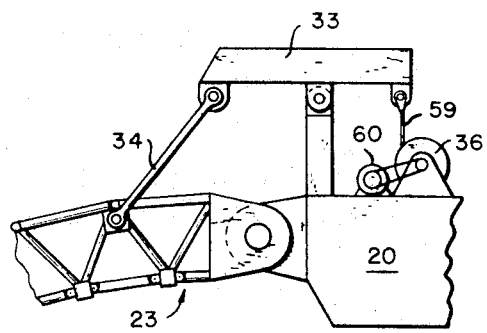
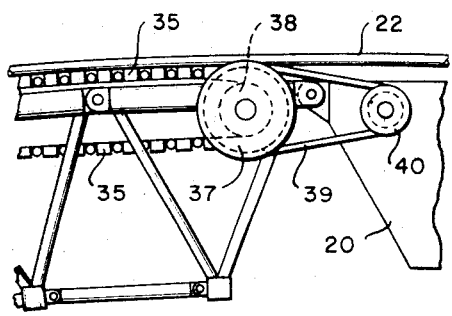
FIG. 5  FIG. 6
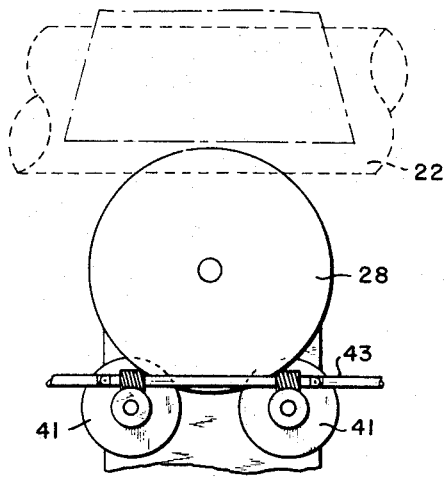
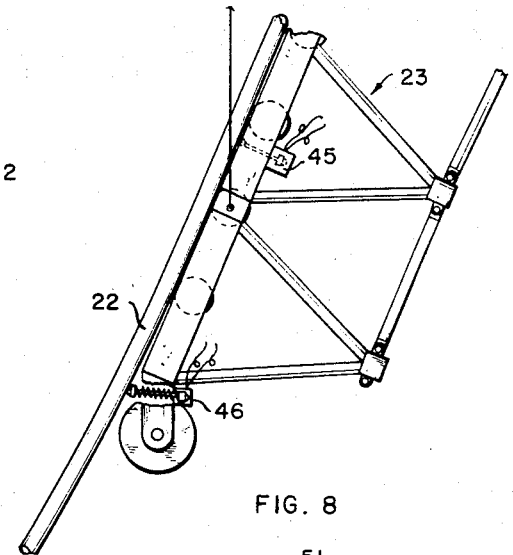
FIG. 7  FIG. 8
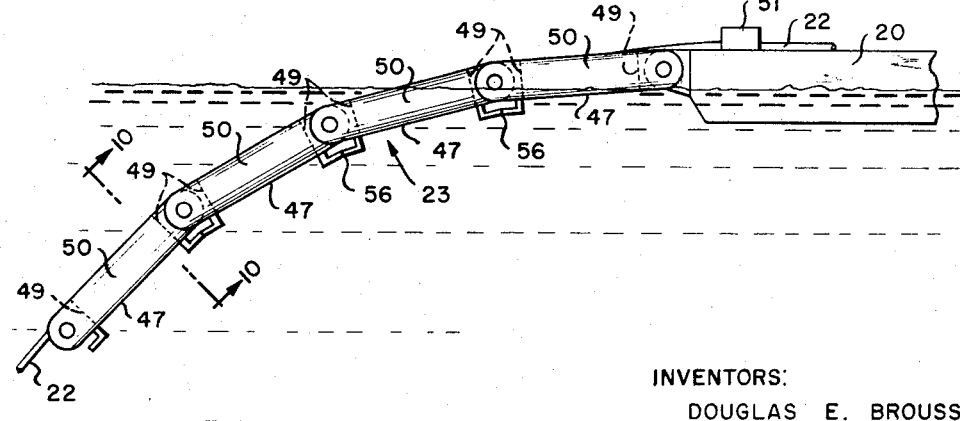
FIG. 9
INVENTORS:
DOUGLAS E. BROUSSARD
DONALD W. BARRY
BY:
THEIR AGENT

INVENTORS:
DOUGLAS E. BROUSSARD
DONALD W. BARRY

BY:

A. H. McCarthy
THEIR AGENT

Oct. 14, 1969    D. E. BROUSSARD ET AL    3,472,035
METHOD OF ABANDONING AND RECOVERING A PIPELINE
DURING AN UNDERWATER PIPE LAYING OPERATION
Filed May 11, 1967    6 Sheets-Sheet 5

INVENTORS:
DOUGLAS E. BROUSSARD
DONALD W. BARRY

BY: A. H. McCarthy

THEIR AGENT

Oct. 14, 1969    D. E. BROUSSARD ET AL    3,472,035
METHOD OF ABANDONING AND RECOVERING A PIPELINE
DURING AN UNDERWATER PIPE LAYING OPERATION
Filed May 11, 1967    6 Sheets-Sheet 6

INVENTORS:
DOUGLAS E. BROUSSARD
DONALD W. BARRY

BY: J. H. McCarthy

THEIR AGENT

United States Patent Office 3,472,035
Patented Oct. 14, 1969

3,472,035
METHOD OF ABANDONING AND RECOVERING A PIPELINE DURING AN UNDERWATER PIPE LAYING OPERATION
Douglas E. Broussard and Donald W. Barry, Houston, Tex., assignors to Shell Oil Company, New York, N.Y., a corporation of Delaware
Filed May 11, 1967, Ser. No. 637,674
Int. Cl. E02f 1/00; B63b 35/04; F16l 1/00
U.S. Cl. 61—72.3                                 11 Claims

ABSTRACT OF THE DISCLOSURE

A method of abandoning and recovering a pipeline during an underwater pipe-laying operation from a barge having a curved pipe discharge ramp or so-called "moment-limiting guide." When it is desired to abandon the pipe-laying operation and lower the pipeline onto the ocean floor, e.g., during a storm, the moment-limiting guide is moved out of substantial buoyant contact with the pipeline by flooding the guide or pivoting it away from the pipeline. The pipeline may then be lowered onto the ocean floor by means of a cable attached to the free end of the pipeline. The pipeline may then be recovered by reversing the above procedure so that the pipe laying operation may continue.

---

This invention relates to pipe-laying vessels and more particularly to a pipe-laying barge employing apparatus for controlling the curvature of a pipeline as it leaves the barge, and to a method of abandoning and recovering the pipeline during a pipe-laying operation.

With the increased development of gas and oil wells offshore, demand for pipe-laying apparatus to connect underwater facilities or to bring products to shore has increased. Frequently, barges are employed to lay underwater pipelines along the floor of a body of water by assembling pipe lengths on the barge and moving the barge as the assembled pipeline is payed out and laid onto the ocean floor. Also, the pipe lengths may be pre-assembled and wound onto a reel which is then rotatably mounted on the barge. The pipe employed is generally made of steel and capable of withstanding some bending but any bending of the assembled pipeline must be maintained within predetermined limits to avoid kinking or severely deforming the pipeline which would render it ineffective. It will be observed that as pipeline is laid from a barge the pipe exits the barge and follows a somewhat S-shaped configuration from the barge deck to the ocean floor. In relatively shallow waters, the vertical descent of the pipeline, being small, results in a large radius of curvature of the pipeline as it comes off the barge. However, as the water depth increases, the length of unsupported pipeline increases and causes the pipeline to sag under its weight. Thus, the radius of curvature of the pipeline as it leaves the barge becomes smaller and the bending moments imposed on the pipeline may exceed the allowable limits and result in permanent deformation or kinking of the pipeline.

Accordingly, it is a primary object of this invention to provide a pipe-laying apparatus which is adapted to lay pipeline on the floor of a body of water without damaging the pipeline and to prescribe a procedure whereby the construction operations might be temporarily terminated, the pipeline abandoned safely on bottom, and thence recovered to resume construction operations.

It is another object of this invention to provide a pipe-laying apparatus that will limit the radius of curvature of the pipeline as it leaves a pipe-laying barge.

Still another object is to provide apparatus which is adjustable to vary the radius of curvature of the pipeline as it is being laid.

It is a further object to provide the apparatus with means to impose an axial tension on the pipeline as it is laid.

A still further object is to provide sensing means on said apparatus to indicate the position of said pipeline relative to the apparatus for controlling the position of the pipe-laying barge and for controlling the shape of and loads applied to said apparatus.

These and other objects will become apparent from the reading of the following detailed description taken in conjunction with the accompanying drawings in which:

FIGURE 1 is an elevation of a pipe-laying barge incorporating the apparatus of the present invention;

FIGURE 2 is a cross-sectional view taken along line 2—2 of FIGURE 1;

FIGURE 3 is an elevation showing a modified form of the invention;

FIGURE 4 is a detail view of one arrangement for attaching the subject appartus to a lay barge;

FIGURE 5 is a detail view showing another arrangement for attaching the apparatus;

FIGURE 6 is a detail view showing a drive means for a pipe tensioning belt which may be incorporated in the present invention;

FIGURE 7 is a schematic cross-section taken along the lines 7—7 of FIGURE 2;

FIGURE 8 is a detail view in elevation of the free end of the apparatus including pipe sensing means;

FIGURE 9 is an elevation showing another modified form of the invention;

Referring now to FIGURE 1, a pipe-laying barge 20 is shown positioned on the surface of a body of water 21. The barge may be of any suitable type known in the art adapted for laying a continuous pipeline 22 along the floor of a body of water. For example, the barge may be of a type in which pipe sections are joined, for example, by welding, on the deck of the barge or it may be a reel-type barge in which a spool or reel, wound with assembled pipe lengths, is rotatably mounted on the deck of the barge so that as the barge is moved the reel unwinds thereby paying out the pipeline.

Figure 11:
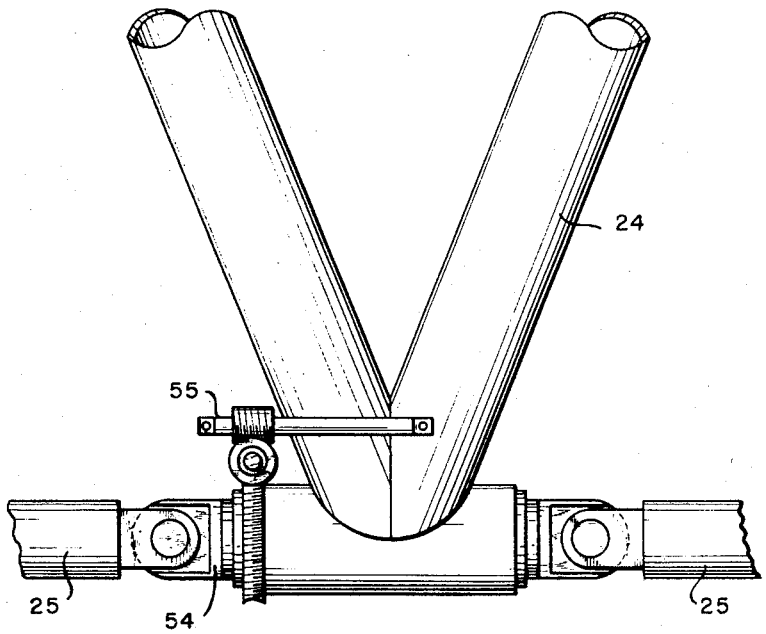
FIGURE 11 is a detail view in elevation of a portion of the subject apparatus showing adjusting means for varying the curvature of the device.

Fixedly attached to the barge 20 at the point the pipeline 22 leaves the barge is a so-called "moment-limiting guide" or articulated discharge pipe ramp indicated generally by the numeral 23. The guide is comprised of pivotally joined sections 24 each having the general form of an inverted cone. Interposed between the sections 24 are extensible members 25 which can be remotely extended or shortened from the barge 20. It will be seen that the members 25 form chordal segments or an arch so that when they are shortened or lengthened the radius of the arc is varied. As best seen in FIGURE 11, each member 25 is pivotally joined to the sections 24 by means of an adjustable rod 54. The rod 54 is extended or contracted by suitable gearing driven from the barge through a drive shaft 55. Although the adjusting mechanism for only one section 24 is shown in FIGURE 11, it will be understood that similar adjusters are provided for each section 24 and may all be driven simultaneously by means of drive shaft 55. Of course, other means of adjusting the member 25 may be employed without departing from the invention, e.g., the rods 54 may be hydraulically actuated or electrical means may be employed. When the members 25 are shortened the pivotally joined sections 24 move about pivots 26 thereby varying the radius of curvature of the entire moment-limiting guide 23.

Each section 24 includes cross bracing 27 which rotatably carries pipe-engaging support rollers 28 and lateral restraining rollers 29, as shown in FIGURE 2. These rollers provide a continuous cradle or trough for the pipeline 22 as it is payed out. Thus, it will be seen that when a plurality of the sections 24 are pivoted about pivot pins 26, the radius of curvature of the cradle formed by a plurality of the rollers 28 and 29 is also varied thereby controlling the curvature of pipeline 22. Since the moment-limiting guide is a cantilevered structure, it is preferable to support the free end with a guideline 29 secured to an auxiliary vessel 30. Other suitable means may be employed, e.g., a buoy may be used in place of the vessel 30.

One modification of the moment-limiting guide 23 is shown in FIGURE 3. In this arrangement only a portion of the guide 23 is made of pivotally joined sections. As shown, approximately the first or inboard half of the guide is constructed in a fixed arc with the remainder of the guide being made up of pivotal sections 24 in the manner described hereinabove with reference to FIGURES 1 and 2.

In addition, the guide 23 may be pivotally joined to the barge 20. The guide may be freely pivoted as shown in FIGURE 3 or an air spring 31 may be connected between the barge 20 and the guide 23 (see FIGURE 4). The air spring 31 dampens the action of the guide in the event of sudden loading or unloading. By varying the air supply through hoses 32 to either side of a cylinder (not shown) within the air spring 31 the entire guide 23 can be pivoted to any desired position. A stop 57 may be secured to the guide to limit the downward movement of the guide 23 with respect to the barge 20.

Another arrangement for pivoting the entire guide 23 is shown in FIGURE 5. A rocking beam 33 is connected at one end to a tie rod 34 and the other end is operably connected by cable 59 to reel 36 driven by motor 60. It will be seen that the motor 60 will move or rock beam 33 and the movement will be translated to the guide 23 through the tie rod 34, thereby pivoting the guide with respect to the barge 20.

Other means for supporting the pipeline 22 along the moment-limiting guide 23 may be employed in place of or in addition to rollers. For example, as shown in FIGURE 6, an endless belt 35 may be used in place of the rollers 28 and 29 shown in FIGURE 2. The belt 35 preferably extends the length of the guide 23 with the upper surface exposed to support pipeline 22. In order to prevent the pipeline from moving laterally off the belt 35, the belt may be constructed with a pipe-engaging groove or the belt may have a somewhat V cross-section to cradle and laterally restrain the pipeline.

In some pipe-laying operations, particularly in deep water, it may be desirable to apply a predetermined axial tension to the pipeline as it is being laid in order to change or reduce the natural curvature assumed by the pipeline in the water. This tension tends to straighten the pipeline somewhat thereby reducing the curvature at the point the pipeline contacts the ocean floor. Accordingly, suitable tensioning means may be employed in conjunction with the present invention.

As shown in FIGURE 1, a dynamic braking device 36 including a series of pipe-engaging tension rollers 58 may be mounted on the deck of barge 20. By dynamically braking the rollers or increasing their frictional contact with the pipeline 22, a tension will be imposed in the pipeline. The amount of tension required can be predetermined analytically. As the position of the vessel is varied, which is typically controlled with tugs or by winching in lead anchor lines while paying out trailing anchor lines, constant tension will be maintained in the pipeline by the braking device 36. Also, when the barge 20 is at rest, e.g., when additional pipe lengths or equipment is being taken aboard, the predetermined tension will be maintained by the device 36 or by attaching the end of the pipeline to a constant tension winch.

An alternative arrangement for applying the tension is shown in FIGURE 6 wherein the endless belt 35 is dynamically braked in a direction opposite to the direction the pipeline is being laid. A pulley 37 may be attached to roller 38 and connected through belt 39 to a slip drive 40 located on the barge 20. The belt is not driven so that the frictional contact between pipeline 22 and belt 35 is broken but the slip drive does restrain the free travel of the belt to thereby tension the pipeline. Of course, other suitable brakes or slip drives may be used to dynamically brake the belt 35, e.g., a friction brake may be attached to the shaft of roller 38 or other frictional devices may be used to restrain the belt 35.

In the embodiment shown in FIGURE 2, the support rollers 28 can be braked to tension the pipeline 22 by means of drive rollers 41 in rolling contact with support rollers 28. As best seen in FIGURE 7, the drive rollers can be oppositely driven from the barge 20 by an articulated drive shaft 43 carrying worm gears 43. The worm gears mesh with pinions attached to the shaft of rollers 41.

The arrangements discussed above for imparting tension to the pipeline 22 are by way of example only and other devices can be readily substituted by one skilled in the art.

When the moment-limiting guide 23 is in use it will be observed that a major portion of the guide is generally disposed beneath the surface of the water. This condition precludes a visual inspection to determine if the pipeline 22 is maintaining proper contact with the guide 23. It will be apparent that if the barge 20 is too far forward the pipeline will be pulled out of contact with the guide. Conversely, if the barge is not advanced rapidly enough, the pipeline may bend about the free end of the guide with the free end acting as a fulcrum thereby causing the pipeline to form a "hump" along the length of the guide.

In order to obviate these conditions, it is desirable to employ some form of indication of the pipeline-to-guide contact which is readily observable to an operator on the barge 20, so that he may regulate the barge position. Accordingly, position-indicating means in the form of on-off switches 45 and 46 may be located on the guide 23 near its free end with spring loaded contact actuators positioned to bias against the pipeline 22. As shown, the pipeline 22 is in the desired curvature and maintains proper contact with the guide 23. In this condition switch 45 is closed and switch 46 is open. Suitable warning lights (not shown) connected to the switches and located on board the barge 20 provide a visual indication for the barge operator. In the event the barge is leading the laying operation, switch 45 will open and if the barge is trailing the operation switch 46 will be closed. When either condition exists, the barge operator is provided with a visual indication that the pipeline 22 is not maintaining proper contact with the guide 23 and the position of the barge is varied accordingly. Of course, switches 45 and 46 are shown by way of example only and it will be apparent that other means may be employed to give a visual indication of the position of the pipeline relative to the guide 23.

Figure 10:
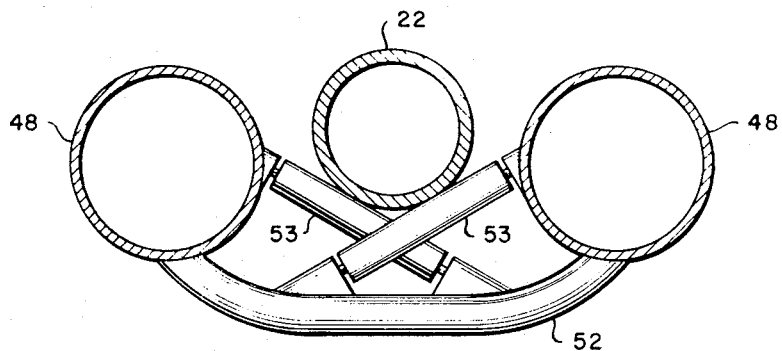
FIGURE 10 is a cross-section taken along the lines 10—10 in FIGURE 9.

The moment-limiting guide 23 may also be of an articulated construction as shown in FIGURES 9 and 10. This guide is comprised of pivotally joined sections 47 each containing tubular members 48 connected by cross-bracing 52 which carries suitable rollers 53 in the shape of a V to support the pipeline 22. Each tubular member is fitted with one or more bulkheads 49 to form buoyancy chambers 50 within the members 48. Each section 47 is provided with an adjustable positive stop 56 which establishes the minimum radius of curvature that can be assumed by the guide. Suitable pumping means 51 on the barge 20 supply air to the chambers 50 through a plurality of conduits or hoses. Alternatively, remote valve means (not shown) operated from the barge 20 can be employed to selectively flood the chambers 50. It will be seen that as the chambers 50 are flooded, the contained sea water provides negative buoyancy which in combination with the weight of pipe 22 bends the guide 23 into the position of maximum curvature. When the sea water is evacuated, the guide will tend to assume a more gradual curvature. One or more of the stops 56 may contain suitable means for measuring the force applied to the stop and indicating this force on board the barge 20. This information will be used to regulate the buoyancy in the various sections 47 to achieve the most desirable shape in the guide 23 for any particular pipe-laying operation.

Since the moment-limiting guide may not be structurally capable of carrying the large loads that would be imposed upon it in laying a pipeline in deep water, the support for the pipeline is preferably achieved by monitoring the loads on the guide and regulating the buoyancy along the length of the guide to minimize these structural loads. This considerably reduces the size of the structure required to support the pipe and simplifies the mechanism required for controlling its shape.

A buoyant moment-limiting guide with adjustable stops as disclosed in FIGURES 9 and 10 has the further advantage in that the sections 47 may be interchangeable to permit replacement of damaged sections and it may be easily shortened or lengthened. In addition, the stinger may be disassembled for shipment or storage and may be assembled or disassembled at sea as may be required.

Occasionally, it is necessary or desirable during the course of a pipe-laying operation as thus far described, to cease the pipe-laying operation and abandon the pipeline by lowering it to the floor of a body of water. Subsequently, the pipeline is recovered in order to continue the laying operation. This procedure is often dictated, for example, during a storm due to the rough seas which may cause considerable motion between the barge and the pipeline and possible damage to the moment-limiting guide 23 and/or the pipeline 22. In addition, abandoning and recovering the pipeline may be desirable during a temporary shut-down for repairs to the moment-limiting guide or pipe-handling equipment aboard the barge or to replenish supplies of materials that cannot be delivered at the work location.

The most difficult part of abandoning and recovering the pipeline is the maneuvering of the pipeline 22 into and out of the moment-limiting guide 23 while holding the pipeline under tension. If the tension on the pipeline is released to allow the pipeline to slide off the moment-limiting guide in deep water, the resultant sag in the unsupported section of the pipeline would tend to buckle the pipeline at the lower end of the unsupported section. The tension may, of course, be maintained and the barge moved forward from under the pipeline. However, as the end of the pipeline travels over the short radius moment-limiting guide 23, it would tend to straighten and move away from the guide and develop too much bending in the end of the pipeline. Due to the geometry of the system, the pipeline would impose rather large bending moments on the moment-limiting guide would damage the guide. If the guide is supported by buoyancy as shown in FIGURE 9, there is an additional problem of continuously adjusting the buoyancy of the guide as the pipeline is lowered which, if improperly adjusted, could damage the guide.

Similarly, when terminaing a pipe-laying operation in deep water as when the barge approaches an offshore installation to which the pipeline is to be connected, the same problems exist in lowering the pipeline onto the floor of the body of water.

Thus, it is an object of this invention to provide abandoning and recovering of the pipeline during the laying operation without causing damage to the moment-limiting guide 23 or to the pipeline. It is a further object to provide a method of terminating the pipe-laying operation.

Figure 12:
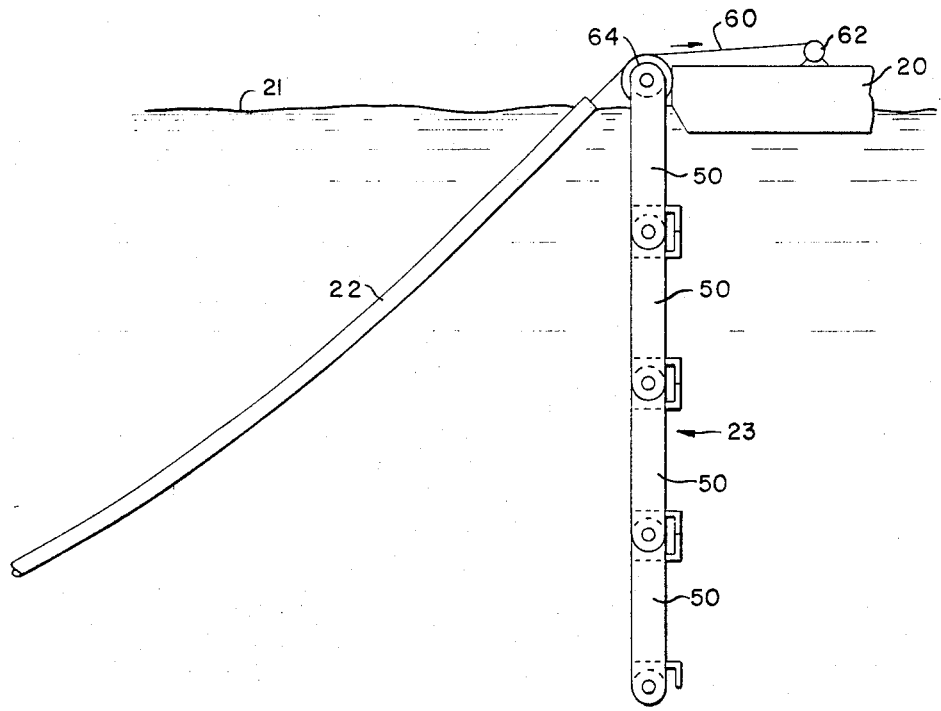
FIGURE 12 is an elevation showing the apparatus of the FIGURE 9 embodiment pivoted away from the pipeline.

One advantage of an articulated buoyant moment-limiting guide as shown in FIGURE 9 is the ability to reduce the buoyancy of the guide so that it will swing out of the way as shown in FIGURE 12. When it is desired to abandon and recover the pipeline 22, a cable 60 is attached to the pipeline and tension maintained in the direction of the arrow (see FIGURE 12). The buoyancy chambers 50 are at least partially flooded to cause the moment-limiting guide to pivot away from the pipeline 22 while tension is maintained on the pipeline by means of the cable 60 and suitable reeling means, e.g., winch 62.

If the chambers 50 are flooded sufficiently to reduce the buoyancy of the moment-limiting guide to a negative value, the guide will assume a substantially vertical position as shown in FIGURE 12. However, for the purposes of the invention it is only necessary that the buoyancy of the moment-limiting guide be reduced so that the guide is no longer in substantial buoyant contact with the pipe. The phrase "substantial buoyant contact" as used herein with regard to the moment-limiting guide 23 is intended to mean contact with the pipeline while exerting a large upward or buoyant force, for example, a buoyancy per unit length of the guide equal to or exceeding the submerged weight per unit length of the pipe. Thus, as shown in FIGURE 13, the moment-limiting guide 23 need not be moved out of contact with the pipeline but merely flooded sufficiently to eliminate substantial buoyant contact.

In some situations in deep water it may be desirable to flood the moment-limiting guide to zero or negative buoyancy. However, it is anticipated that more often it will be desirable to maintain some slight positive buoyancy in the moment-limiting guide 23 during the operations so that the pipeline 22, cable 60 and moment-limiting guide 23 will tend to stay in alignment during the operation. Just how much positive buoyancy will depend on the length of the moment-limiting guide 23 and the weight and bending rigidity of the pipe being handled. In any event it will be desirable to reduce the buoyancy from that used during the pipe-laying operations. In nearly all pipe-laying operations the buoyancy per unit length of the moment-limiting guide will be equal to or larger than the unit negative buoynacy of the pipe being handled when submerged. Thus, the desired buoynacy of the moment-limiting guide during abandoning or recovery should always be less than the unit weight of the pipe being handled.

Figure 13:
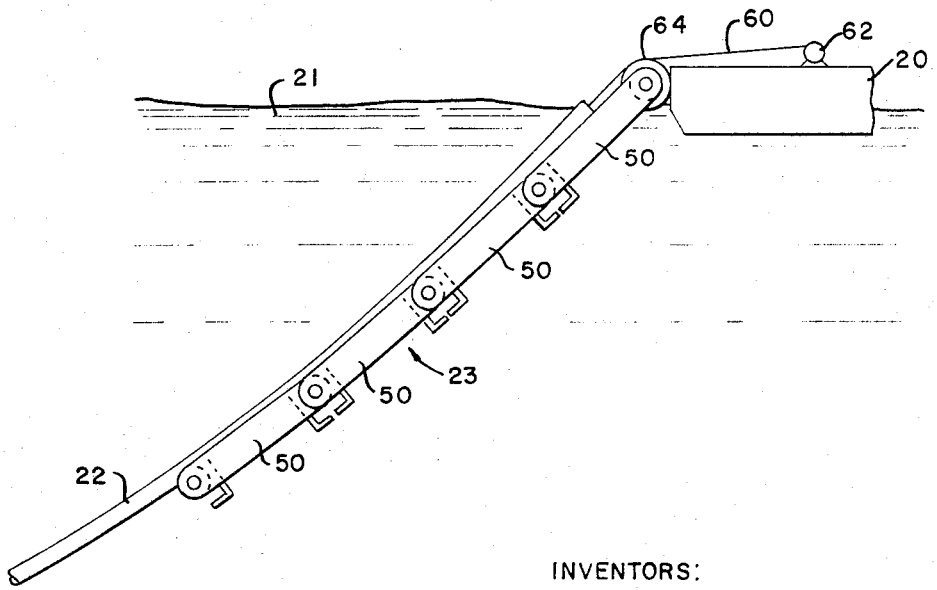
FIGURE 13 is an elevation similar to FIGURE 12 with the subject apparatus partially pivoted away from the pipeline.

After the chambers 50 are flooded to cause the moment-limiting guide to swing away from the pipeline as shown in FIGURE 12 or the guide is moved out of buoyant contact as shown in FIGURE 13, the cable 60 is payed out while maintaining tension on the cable to thereby lower pipeline 22 onto the floor of the body of water 21. At this time the pipeline 22 is conveniently at rest without risk of damage to the pipeline or barge as may be encountered during a storm. Also, repairs to the guide or the barge equipment may be more readily performed with the pipeline on the ocean floor.

When conditions permit recovery of the pipeline so that the pipe-laying operation may continue, the procedure for abandoning the pipeline described above is reversed. That is, the cable 60 is hauled in by means of winch 62 until the end of the pipeline is in the approximate position shown in FIGURE 12 or 13. The moment-limiting guide 23 is buoyed up by evacuating the chambers 50 or portions thereof to place the guide in substantial buoyant contact with the pipeline 22, as shown in FIGURE 9. The end of the pipeline may then be brought on deck by merely reeling in the cable 60 or backing up the barge 22 while the cable is reeled in. A sheave 64 is preferably employed at the stern of the barge to serve as a guide for the cable 60.

Once the end of the pipeline is on the deck of the barge, additional pipeline or pipe lengths may be added and the laying operation continued in a conventional manner.

Figure 14:
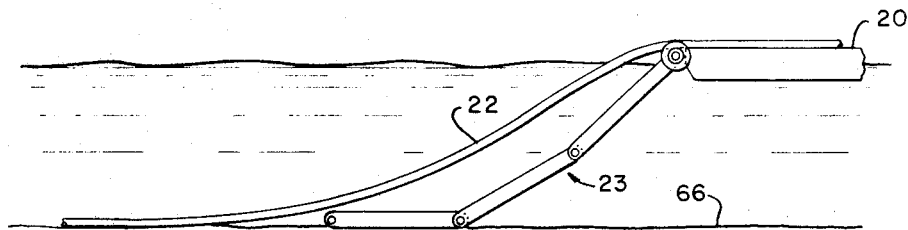
FIGURE 14 is an elevation of the subject apparatus employed in shallow water.
Figure 15:
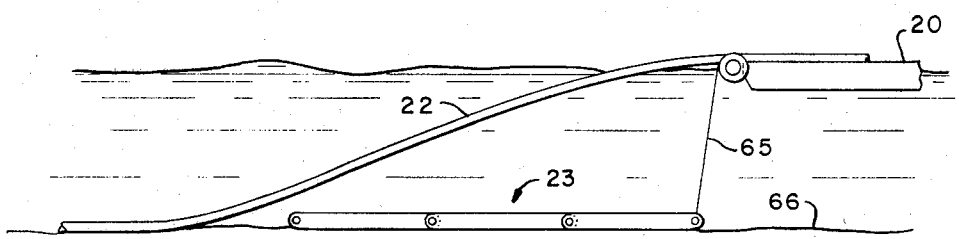
FIGURE 15 is the same elevation as FIGURE 14 with the subject apparatus disconnected from the lay barge and lowered to the floor of the body of water.
Figure 16:
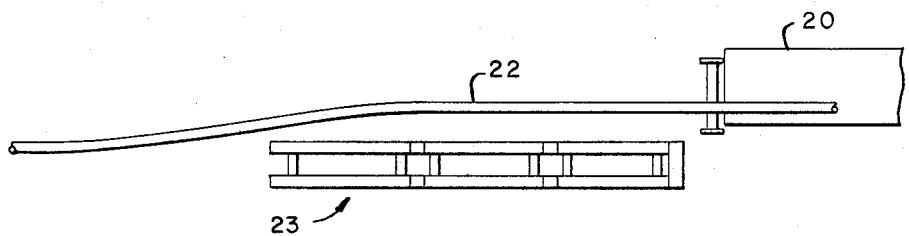
FIGURE 16 is a plan view of FIGURE 15.

In shallow waters, the procedure for abandoning and recovering the pipeline may be somewhat modified. As shown in FIGURE 14, in shallow water the moment-limiting guide 23 may strike the ocean floor. In this case it may be desirable to maintain a small amount of positive buoyancy in the moment-limiting guide as the pipe is lowered to bottom as described above. This will usually prevent the moment-limiting guide from touching bottom which may cause damage as a result of movement due to heave and pitch of the lay barge. In some instances, however, it may be desirable to lay the moment-limiting guide on bottom. It is therefore contemplated that the procedure for abandoning and recovering the pipeline in shallow water may include disconnecting the moment-limiting guide 23 from the barge 20 and lowering the guide by means of a cable 65 onto the ocean floor 66 as shown in FIGURE 15. Once the guide is on the floor the barge 20 is moved laterally as shown in FIGURE 16 so that the pipeline will clear the moment-limiting guide when it is lowered. The procedure for lowering the pipeline is identical to the method described with reference to FIGURES 12 and 13. Recovery of the pipeline is accomplished by reversing the procedure described with reference to abandoning the pipeline.

In the event it is desired to remove the moment-limiting guide, e.g., in very shallow waters where it is unneeded, the guide may be lowered to the ocean floor and the barge moved laterally as described which then places the guide in a convenient location for subsequent recovery aboard the barge 20 or onto an auxiliary vessel (not shown).

Figure 17:
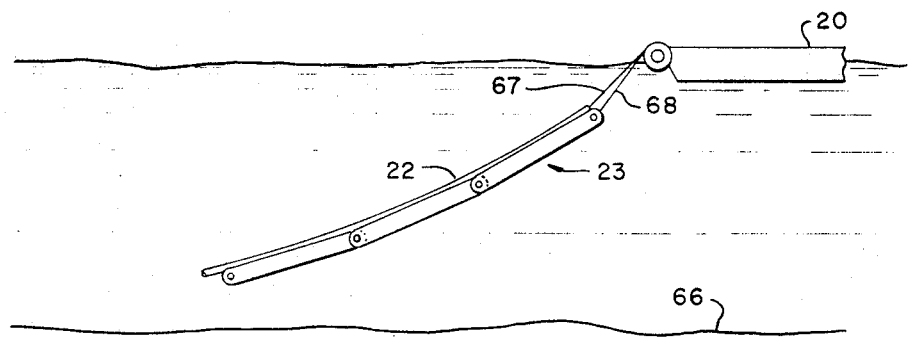
FIGURES 17 and 18 are elevational views of an alternative use of the subject apparatus.
Figure 18:
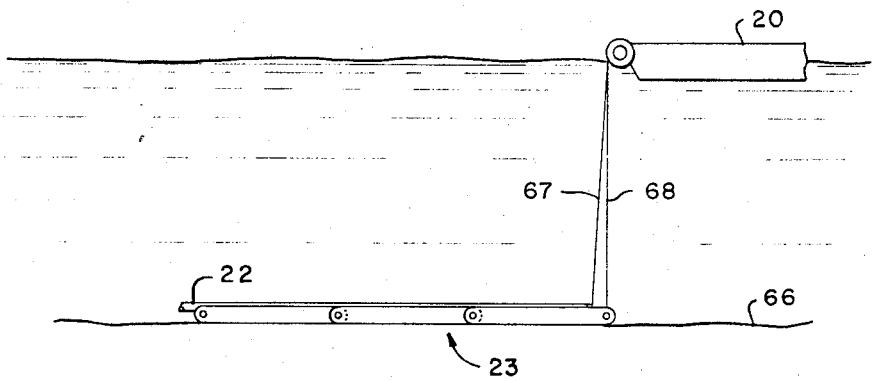

Referring now to FIGURE 17, the lowering of the pipeline and the moment-limiting guide 23 onto the floor 66 may be performed simultaneously rather than as separately as previously described. This is accomplished by attaching cables 67 and 68, respectively, to both the pipeline 22 and the guide 23 and lowering them together. Of course, it will be understood that the pipeline 22 and guide 23 may be lowered by a single cable if they are first secured together. The guide and pipeline then rest on the ocean floor as shown in FIGURE 18. Subsequent recovery may be sequential, i.e., the pipeline and then the guide or they may be recovered together.

When the pipe-laying operation reaches a point along its predetermined path where it is desired to terminate the pipeline on the ocean floor, the procedures described above with reference to FIGURES 12-18 for abandoning the pipeline may be employed. In deep water the guide is moved out of substantial buoyant contact with the pipeline (FIGURES 12 or 13) and the pipeline lowered. In shallow water the guide 23 may be disconnected from the barge 20 and lowered to the ocean floor 66 (FIGURES 14-18). The pipeline is then laid alongside the guide by moving the barge laterally and paying out the pipeline onto the ocean floor. The pipeline may then be connected to a terminal point, e.g., an underwater facility, by using divers or by other known methods of making remote underwater connection.

Although in describing the above procedures for abandoning, recovering and terminating a pipeline the buoyant moment-limiting guide disclosed in FIGURE 9 was discussed, it will be apparent that other articulated guides may be used. For example, the guide may be mechanically actuated like the guide shown in FIGURE 1 so long as it is pivotally secured to the barge (see FIGURE 3) and capable of swinging out of substantial buoyant contact with the pipeline.

We claim as our invention:

1. A method of abandoning a pipeline during an offshore pipelaying operation, said method comprising:
   positioning a pipe-laying barge on the surface of a body of water;
   pivotally securing an articulated pipe-discharge moment-limiting guide comprised of a series of selectively buoyant segments connected in end-to-end pivoting relationships, said guide being attached to the stern and extending away from said barge to provide buoyant support for a pipeline;
   moving said barge along a predetermined path while paying out pipeline along said guide and onto the floor of said body of water;
   manipulating said segments into substantial buoyant supporting contact with said pipeline by controlling the buoyancy of said segments;
   terminating said pipe-laying operation;
   terminating said pipeline on said barge to form an upper end of said pipeline;
   attaching a cable to said upper end of said pipeline;
   positioning said pipeline along said guide so that the upper end of said pipeline is over said guide;
   manipulating said segments out of buoyant contact with said pipeline by reducing the buoyancy of said segments; and,
   paying out said cable to thereby lower the upper end of said pipeline onto the floor of said body of water.

2. A method as defined in claim 1 wherein said guide is pivotally moved away from said pipeline into a substantially vertical position.

3. A method as defined in claim 1 wherein:
   the step of reducing the buoyancy of said segments to manipulate said segments out of substantial buoyant supporting contact with said pipeline comprises flooding buoyancy chambers in said segments.

4. A method as defined in claim 1 including the subsequent method of recovering said pipeline, said method further comprising:
   subsequently hoisting said cable to recover said end of said pipeline to the stern of said barge;
   bringing said guide into substantial buoyant supporting contact with said pipeline;
   positioning the end of said pipeline on the deck of said barge;
   disconnecting said cable from the upper end of said pipeline; and,
   continuing said pipe-laying operation.

5. A method as defined in claim 4 wherein said guide is pivotally moved away from said pipeline into a substantially vertical position.

6. A method as defined in claim 4 wherein:
   the step of reducing the buoyancy of said segments to manipulate said segments out of substantial buoyant supporting contact with said pipeline comprises flooding buoyancy chambers in said segments; and,
   said step of bringing said guide into buoyant supporting contact with said pipeline comprises evacuating said buoyancy chambers.

7. A method as defined in claim 4 including the steps of:
   disconnecting said guide from said barge after moving said guide out of buoyant contact with said pipeline;
   lowering said guide onto the floor of said body of water after disconnecting said guide; and,
   re-connecting said guide to said barge prior to bringing said guide into buoyant supporting contact with said pipeline.

8. A method as defined in claim 7 wherein said guide and said pipeline are lowered onto the ocean floor together.

9. A method as defined in claim 8 wherein said guide and said pipeline are recovered from the ocean floor at the same time.

10. A method of terminating a pipeline during an offshore pipelaying operation, said method comprising:

positioning a pipe-laying barge on the surface of a body of water;

pivotally securing an articulated pipe-discharge moment-limiting guide comprised of a series of selectively buoyant segments connected in end-to-end pivoting relationships, said guide being attached to the stern of and extending away from said barge to provide buoyant support for a pipeline;

moving said barge along a predetermined path while paying out pipeline along said guide and onto the floor of said body of water;

manipulating said segments into substantial buoyant supporting contact with said pipeline by controlling the buoyancy of said segments;

terminating said pipe-laying operation;

terminating said pipeline on said barge to form an upper end of said pipeline;

attaching a cable to said upper end of said pipeline;

positioning said pipeline along said guide so that the upper end of said pipeline is over said guide;

manipulating said segments out of buoyant contact with said pipeline by reducing the buoyancy of said segments;

paying out said cable to thereby lower the upper end of said pipeline onto the floor of said body of water; and, connecting said upper end of said pipeline to a terminal point.

11. A method as defined in claim 10 including the steps of:

disconnecting said guide from said barge after moving said guide out of buoyant contact with said pipeline;

lowering said guide onto the floor of said body of water after disconnecting said guide; and, moving said barge laterally prior to paying out said cable to lower the upper end of said pipeline onto the floor of said body of water.

References Cited

UNITED STATES PATENTS

| | | | |
|---|---|---|---|
| 3,247,674 | 4/1966 | Macardier | 61—72.3 |
| 3,273,346 | 9/1966 | Delaruelle et al. | 61—72.3 |
| 3,280,571 | 10/1966 | Hauber et al. | 61—72.1 |
| 3,321,925 | 5/1967 | Shaw | 61—72.3 |
| 3,331,212 | 7/1967 | Cox et al. | 61—72.3 |

JACOB SHAPIRO, Primary Examiner